United States Patent [19]
Rheinlander et al.

[11] Patent Number: 5,536,351
[45] Date of Patent: Jul. 16, 1996

[54] METHOD OF MANUFACTURING A TRIM PANEL HAVING AN AIR BAG DOOR

[75] Inventors: Fred Rheinlander, Rochester Hills, Mich.; Kevin Logeman, Bowmanville, Canada

[73] Assignee: Davidson Textron, Dover, N.H.

[21] Appl. No.: 403,400

[22] Filed: Mar. 14, 1995

Related U.S. Application Data

[62] Division of Ser. No. 258,720, Jun. 13, 1994.

[51] Int. Cl.$^6$ ........................................................ B32B 3/04
[52] U.S. Cl. ......................... 156/212; 156/216; 156/267; 156/285; 156/286
[58] Field of Search ..................... 156/212, 216, 156/250, 267, 285, 286; 280/728.1, 728.2, 728.3, 732

[56] References Cited

U.S. PATENT DOCUMENTS

| | | | |
|---|---|---|---|
| 3,551,232 | 12/1970 | Thompson | 156/286 |
| 5,252,164 | 10/1993 | Mills | 156/212 |
| 5,335,939 | 8/1994 | Kuriyama et al. | 280/728 B |

*Primary Examiner*—Michael W. Ball
*Assistant Examiner*—Richard Crispino
*Attorney, Agent, or Firm*—Reising, Ethington, Barnard & Perry

[57] ABSTRACT

An interior trim panel for a motor vehicle has an opening for deployment of an air bag and a discrete air bag door that is attached to the interior trim panel for closing the opening and for being opened by an air bag when it is deployed. The door includes a retainer that hinges the door to the trim panel and a covering that includes a frangible flap at an end of the retainer that holds down an end of the door and breaks away when the air bag is deployed. An alternate door has a bracket attached to the retainer that moves the hinge line rearward. The covers of the trim panel and the discrete air bag door retainers may be simultaneously attached to their respective retainers in two variations of a conjoined operation.

5 Claims, 4 Drawing Sheets

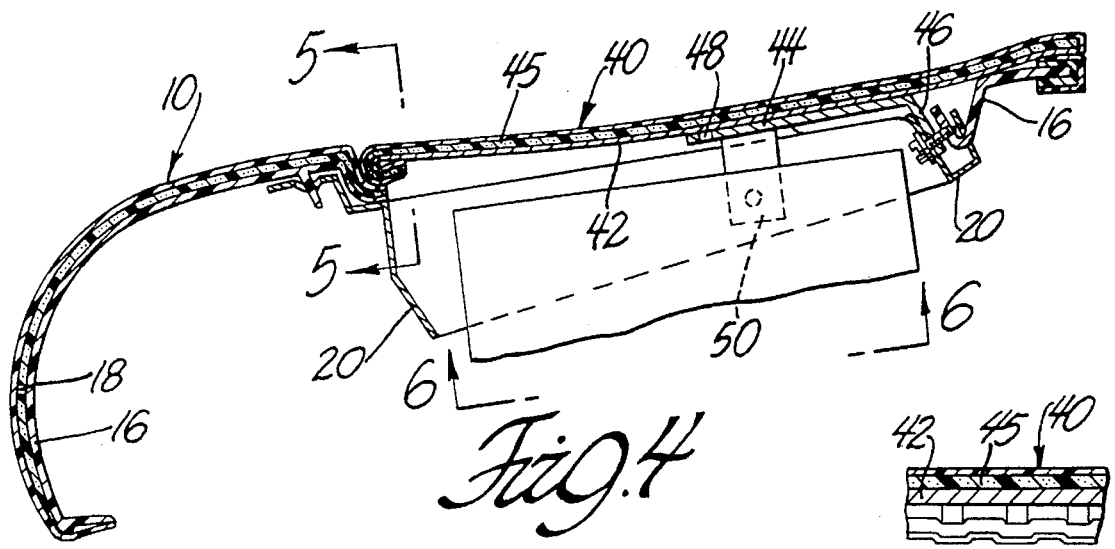
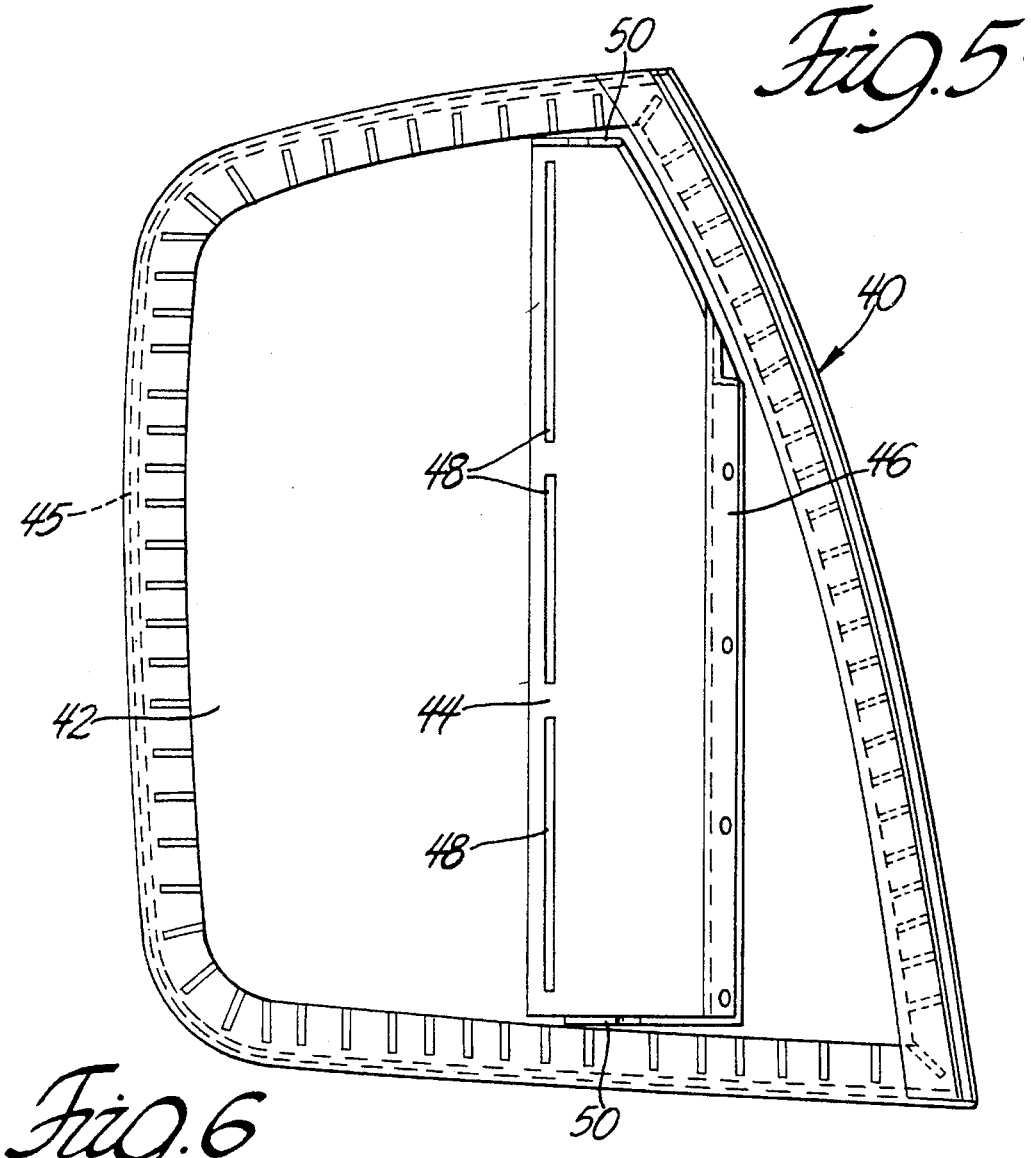

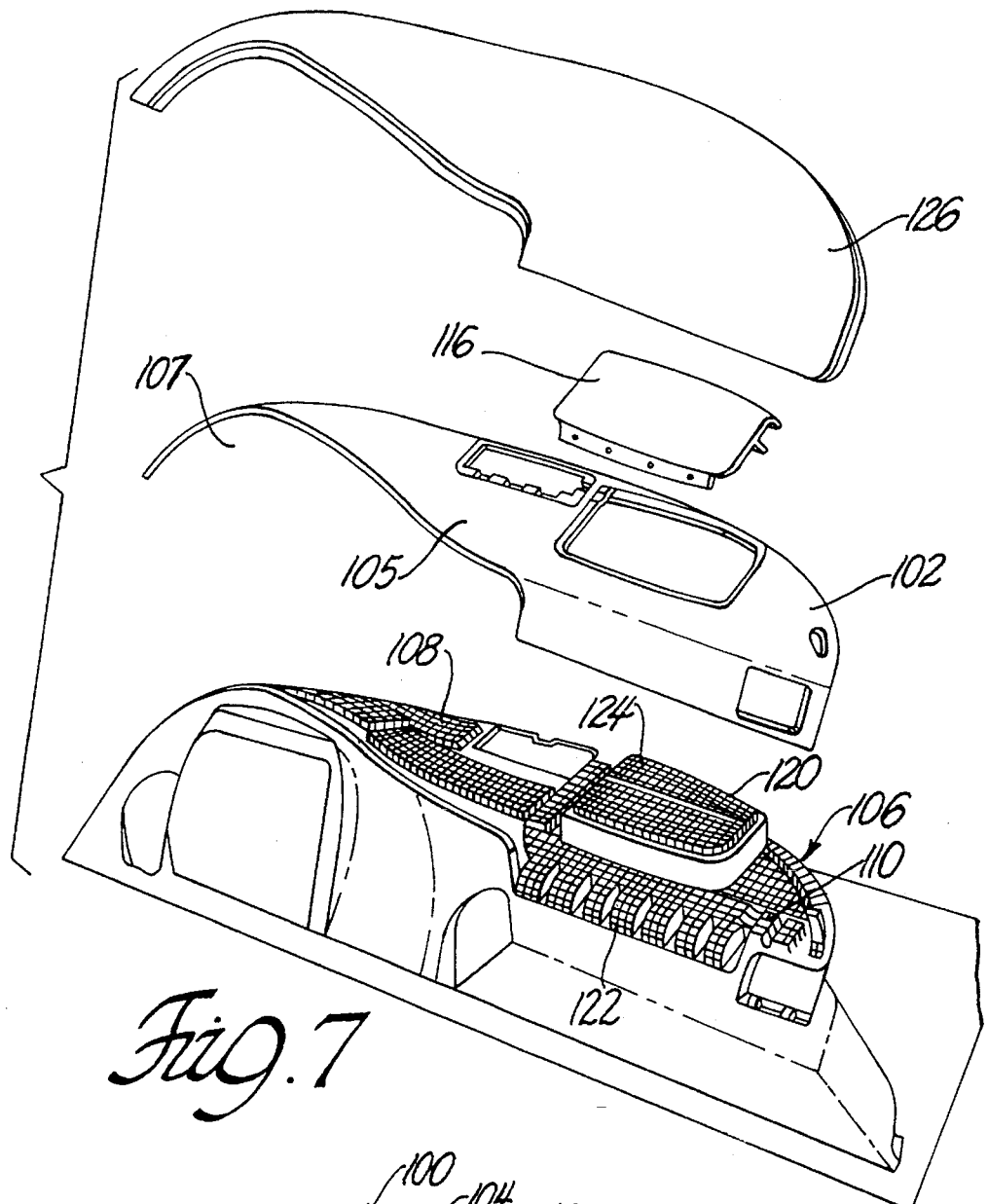
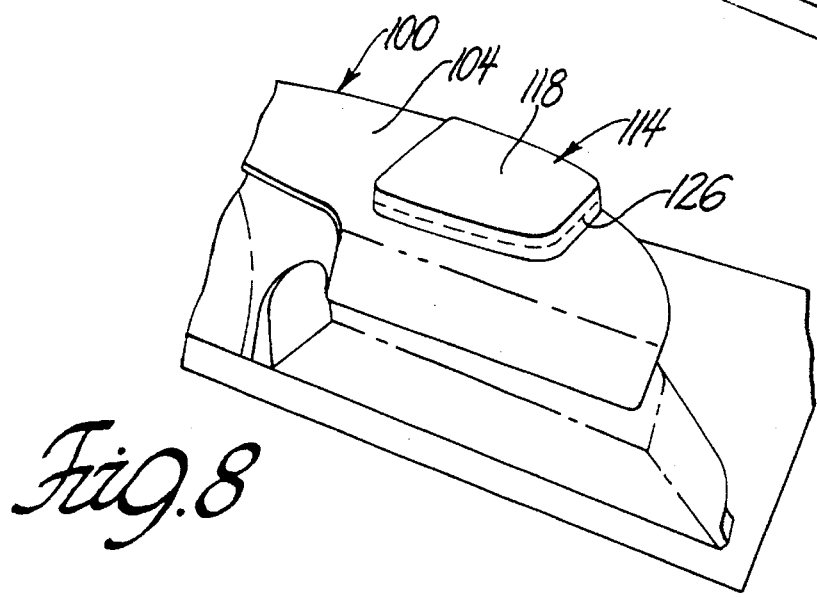

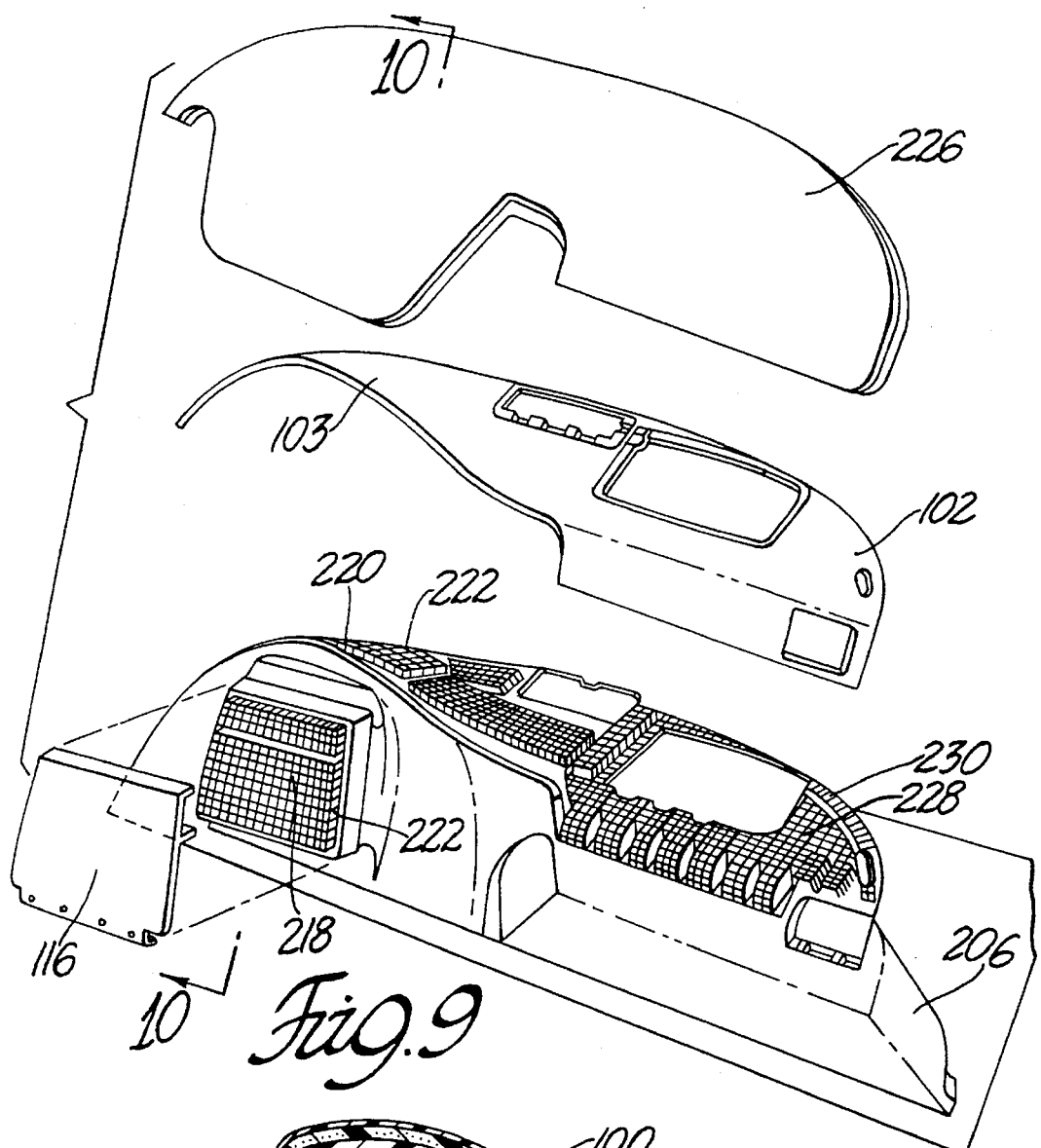
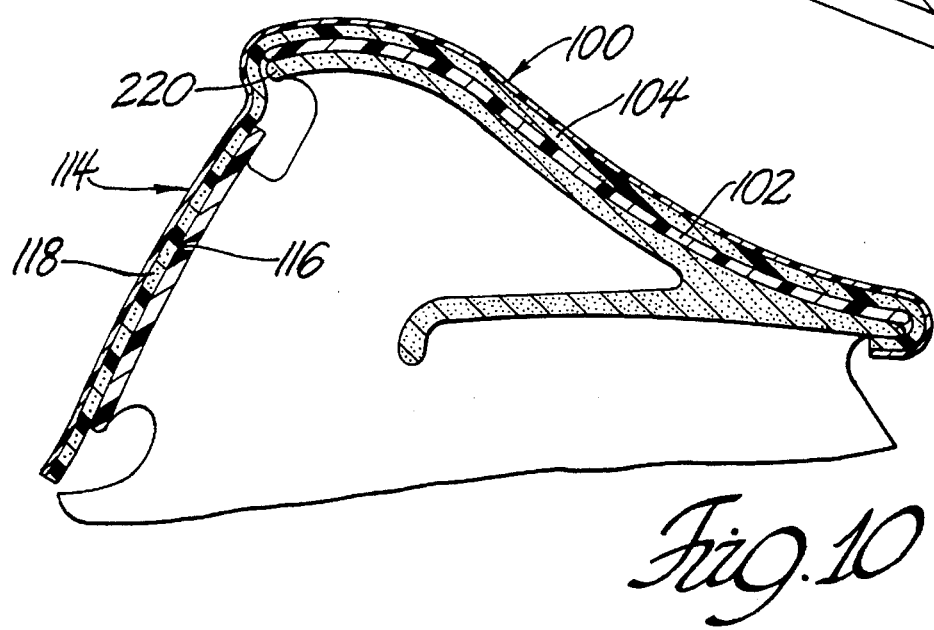

5,536,351

METHOD OF MANUFACTURING A TRIM PANEL HAVING AN AIR BAG DOOR

This is a divisional of copending application(s) Ser. No. 08/258,720 filed on Jun. 13, 1994.

BACKGROUND OF THE INVENTION

This invention relates generally to interior trim panels for motor vehicles and more particularly to interior trim panels that have a discrete air bag door that is opened by an air bag when it is deployed into the passenger compartment.

U.S. Pat. No. 4,893,833 granted to Anthony J. DiSalvo and David J. Bauer Jan. 16, 1990 discloses a closure arrangement for an air bag deployment opening in an automotive instrument panel that includes a discrete door. The door has an inner supporting layer of aluminum that has a hinging extension at one end that is bolted to a structural support plate underlying the instrument panel. The opposite end of the door is held down by a frangible skin and foam tab of the door covering that is beneath a lip of the structural support plate of the instrument panel. In a second version, the door has an inner supporting layer of molded plastic that includes an integral hinging flange near one end that is fastened to the air bag canister. The plastic supporting layer of the door also has an integral frangible flange near the opposite end for holding the opposite end of the door down.

U.S. Pat. No. 4,925,209 granted to Hideyki Sakurai May 15, 1990 discloses an assembly for mounting a discrete air bag door having an aluminum insert formed integrally with the air bag door. The aluminum insert has a hinging extension at an upper end of the door that has bolt holes and a folded outer edge that is wrapped around a reinforcing rod. The door is attached to the air bag canister by bolts inserted into the bolt holes and the reinforcing rod keeps the door attached in case the insert cracks at the bolt holes. The lower end of the door is held down by bolts that extend through cut-outs in the lower end of the door covering to clamp the lower end of the door covering between a resilient member and a flange of the air bag canister.

U.S. Pat. No. 5,096,221 granted to Richard Coombs and Scott Rafferty Mar. 17, 1992 discloses an interior trim panel for a motor vehicle having a discrete air bag door with two substrates. The second substrate is riveted to the first substrate to reinforce the door. The second substrate has extensions at each end which define a hinged connection at one end of the door and a releasable connection at the opposite end of the door which are attached to flanges of the reinforcing insert of the interior trim panel for holding the door in place until the air bag is deployed.

U.S. Pat. No. 5,116,079 granted to Richard D. Rhodes, Jr. May 26, 1992 discloses an automotive instrument panel having an integrated air bag door. The lower end of the door skin carries a depending flap that is sewn to an inwardly extending flap of the instrument panel skin to hold the lower end of the door down. The line of stitching form a frangible tear seam line.

While each of the above discrete air bag door arrangements may be useful for their intended purposes, there is still room for improvement particularly with respect to the attachment of discrete air bag doors to interior trim panels for motor vehicles, such as instrument panels.

SUMMARY OF THE INVENTION

In one aspect the object of this invention is to provide improved arrangements for attaching discrete air bag door to automotive interior trim panels.

In another aspect the object of this invention is to provide improved methods for manufacturing interior trim panels for motor vehicles that have discrete air bag doors attached to the trim panel.

A feature of the invention is that the air bag door covering itself provides a simple and efficient frangible attachment that holds an end of the air door down until it is released in response to deployment of the air bag.

Another feature of the invention is that the air bag door has a two piece retainer that provides a simple, efficient, strong and versatile attachment for hinging the discrete air bag door to an automotive trim panel or other support member.

Still yet another feature of the invention is that the discrete air bag door is efficiently and economically covered simultaneously with an associated automotive trim panel in a conjoined operation that saves time, reduces waste, and improves harmonious appearance of the assembly.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 4 is a cross section of an automotive trim panel illustrating another embodiment of the invention; FIG. 5 is a bottom view of the air bag door taken substantially along the line 5—5 of FIG. 4 looking in the direction of the arrows;

FIG. 6 is a section taken substantially along the line 6—6 of FIG. 4 looking in the direction of the arrows;

FIG. 7 is an exploded perspective view illustrating the manufacture of an automotive trim panel in accordance with another embodiment of the invention;

FIG. 8 is a partial perspective view of the trim panel of FIG. 7 at a later stage of manufacture.

FIG. 9 is an exploded perspective view illustrating the manufacture of an automotive trim panel in accordance with still another embodiment of the invention; and FIG. 10 is a sectional view of the trim panel of FIG. 9 at a later stage of manufacture.

DESCRIPTION OF THE INVENTION

Figure 1:
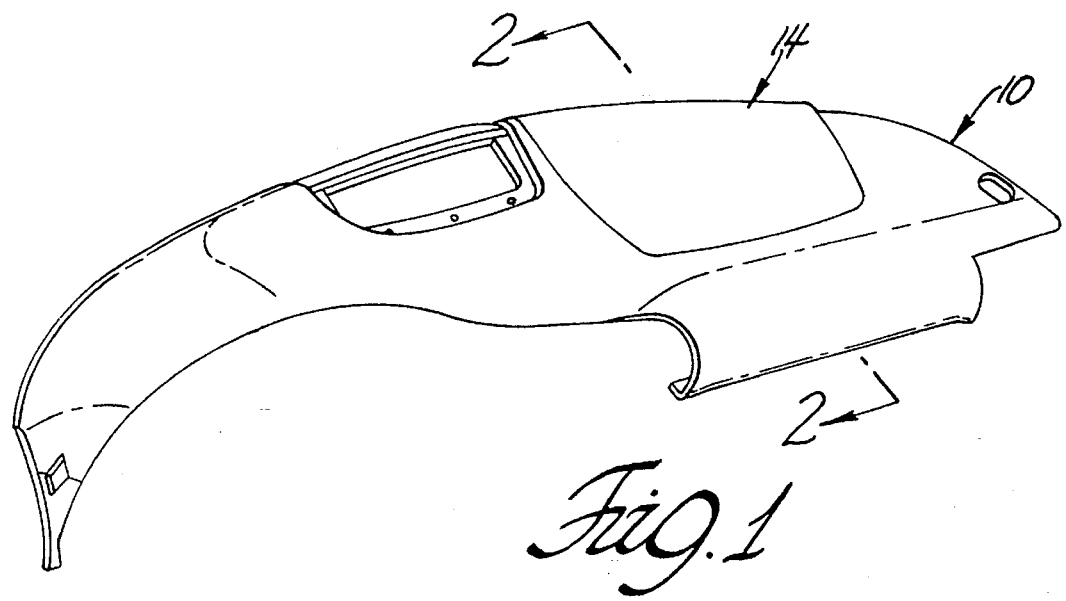
FIG. 1 is a perspective view of an automotive trim panel having an air bag opening that is closed by a discrete air bag door in accordance with the invention.

Referring now to the drawing, FIG. 1 shows an automotive interior trim panel 10 having an air bag opening 12 for deployment of an air bag and a discrete air bag door 14 that is attached to the interior trim panel 10 to close the air bag opening. The door 14 is opened by the air bag which is stored in a canister 15 beneath the door 14 when the air bag is deployed responsive to a predetermined vehicle deceleration in a well known manner.

The interior trim panel 10 comprises a retainer 16 of relatively rigid plastic material such as polycarbonate, polypropylene or any injection moldable structural plastic and such material may be filled with glass fibers or the like. The retainer 16 may also be a metal casting or stamping that is molded to the final shape needed for functional and pleasing shape of the finished trim panel 10. The retainer 16 can also be made of a porous fiber board-like material enerby absorbing foam, steam chest molded bead foam and other moldable compositions that meet the specifications for a structural retainer.

The interior trim panel 10 further comprises a cover 18 of relatively soft and flexible decorative material such as expandable foam backed vinyl that is generally die cut from a continuous sheet of the material. Other examples of a suitable stock for cover 18 include laminations, organic or synthetic cloth or cloth combinations, foam, plastic and other materials generally used in automotive trim panels.

The air bag opening 12 is defined by the retainer 16 and the air bag door 14 is mounted on the retainer 16 by means of an annular metal bracket 20 that is aligned with the air bag opening 12 and fastened to the underside of the retainer 16.

The air bag door 14 is a composite structure comprising a retainer 22 of relatively rigid material, such as steel sheet metal, and a cover 24 of relatively soft and flexible material. The retainer 22 is formed integrally with the air bag door 14 for defining the shape of the air bag door 14 and the cover 24 matches the cover 18 of the interior trim panel 10. In this particular instance the covers 18 and 24 are both made of an expanded vinyl which comprises a skin or outer layer and an integral resilient foam backing layer.

The air bag retainer 22 includes an integral hinge flange 26 near one end by means of which the air bag door 14 is attached to the trim panel 10 to cover the air bag opening 12. In this particular instance, the hinge flange 26 is clamped by walls of the bracket 20 and the trim panel retainer 16 through the operation of threaded fasteners 28 that extend through holes in the hinge flange. This particular trim panel 10 is a top pad for an instrument panel so that the hinge flange 26 is attached near the forward or windshield end of the trim panel 10. The hinge flange 26 establishes the hinge line for pivoting the forward portion of the air bag door 14 upward toward the windshield when it is impacted by the inflating air bag stored in the canister 14 below the door.

Figure 2:
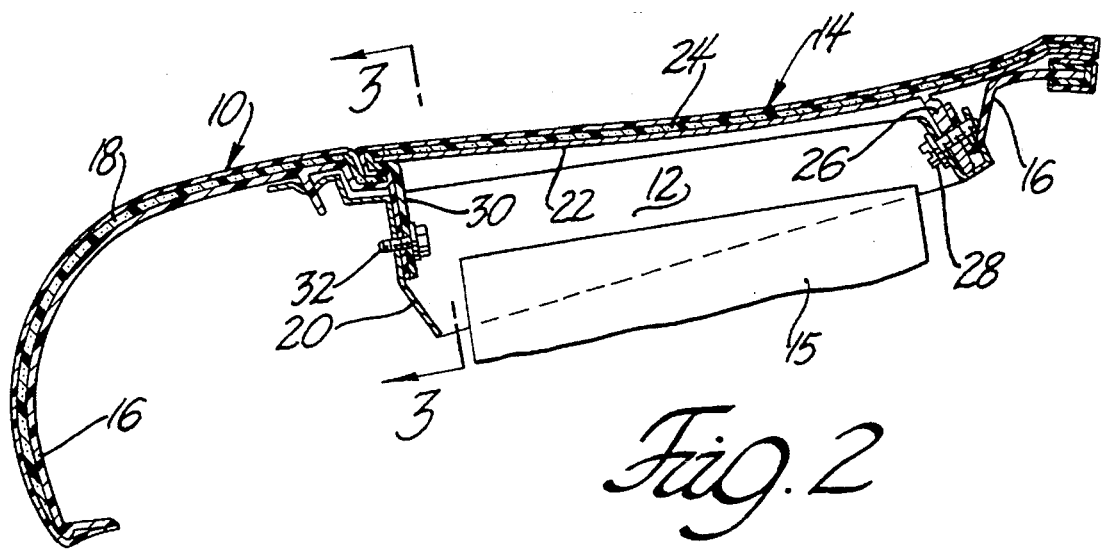
FIG. 2 is a cross section of the trim panel taken substantially along the line 2—2 of FIG. 1 looking in the direction of the arrows.
Figure 3:
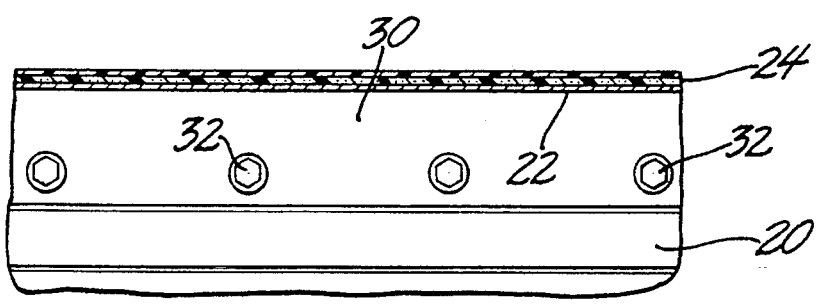
FIG. 3 is a section of the trim panel taken substantially along the line 3—3 of FIG. 2 looking in the direction of the arrows.

The opposite or unhinged end of the air bag door 14 near the rearward or passenger end of the trim panel 10 is held down by a frangible attachment that gives way when the air bag door 14 is opened in response to air bag deployment. This frangible hold-down attachment comprises an extension flap 30 of the cover 24 of the air bag door 14 that extends past the end of the retainer 22 remote from the hinge flange 26. The flap 30 is fastened to the trim panel bracket 20 by a plurality of bolts 32 that extend through preformed holes in the flap 30 and screw into the bracket 20 as shown in FIG. 2. The bolt heads engage the foam backing of the expanded vinyl cover 24 and clamp the skin against the bracket 20. The bolt holes 32 are spaced far enough from the edge of the flap 30 to hold the unhinged end of the air bag door 14 firmly in place yet close enough to the edge so that the bolts 32 pull through the flap 30 from the bolt holes to the edge without causing any appreciable delay when the air bag door 14 is opened in response to air bag deployment. The flap 30 can also be fastened to the bracket 20 by sheet metal screws that cut their own holes in the flap 30 as they are screwed into place.

With regard to the frangible hold down feature, it should be noted that the unhinged end of the air bag door retainer 24 overlaps a ledge of the trim panel 10 at the opening 12 that is nested in a ledge of the trim panel bracket 20. Thus the frangible hold down feature also establishes a very good continuity of the outer surfaces of the trim panel 10 and the discrete air bag door 14 at the unhinged end of the door. Another purpose of the frangible hold down feature is to prevent tampering for instance by prying up the unhinged end of the door 14. The door overlap of the ledge also enhances the tamper proof quality of the arrangement.

Referring now to FIGS. 4, 5 and 6, the interior trim panel 10 is illustrated with an alternate air bag door 40. The discrete air bag door 40 comprises a retainer 42, a bracket 44 and a cover 45. The retainer is made of relatively rigid material, such as steel sheet metal, and formed integrally with the discrete air bag door 40 for defining the shape of the air bag door 40.

The door bracket 44 is made of a heavier gage steel and spot welded or otherwise suitably attached to the retainer 42. It reinforces the air bag door 40, attaches the air bag door 40 to the trim panel 10 and establishes the hinge location for pivoting a portion of the air bag door 40 to an open position responsive to air bag deployment.

The door bracket 44 includes an integral flange 46 at one end that is near one end of the retainer 42 by means of which the air bag door 40 is attached to the trim panel 10 to cover the air bag opening 12. Like the earlier arrangement, the integral flange 46 is clamped by walls of the bracket 20 and the trim panel retainer 16 through the operation of threaded fasteners 28 that extend through holes in the flange. However, unlike the earlier arrangement the integral flange 46 does not establish the hinge line for pivoting the forward portion of the air bag door 40 over the air bag canister 15 to an open position responsive to air bag deployment. In this instance the door bracket 44 locates the hinge line rearward of the integral flange 46, that is, closer to the vehicle occupants and further away from the windshield. The hinge line is established by the body of the door bracket 44 which has a line of slots 48 that define a weakened hinge portion of the body that is substantially parallel to the flange 46. The relocated hinge line shortens the portion of the air bag door 40 that needs to be pivoted to the open position by the deploying air bag and consequently the designer is not limited to pivoting the entire door portion overlying trim panel opening 14 as in the case of the air bag door 12.

The door bracket 44 also preferably includes narrow flanges 50 on opposite sides of the main body for attaching the air bag door 40 to the trim panel bracket 20. These side flanges 50 are located between the slots 48 and the end flange 46 so that they do not interfere with the opening of the rearward door portion on the opposite side of the slots 48. These side flanges 50 also assist in firmly establishing the hinge line at the weakened hinge portion defined by the slots 48.

The door bracket 44 holds the air bag door 40 firmly in the closed position until the air bag is deployed particularly in the case where the side flanges 50 are included. However, in some instances it may also be desirable to provide a positive hold down at the unhinged end of the air bag door 40. In those instances, the frangible hold down arrangement illustrated in conjunction with the air bag door 14 may be incorporated in the air bag door 40.

As indicated above the door bracket 44 is heavier gage steel than the retainer 42 and in this regard a thickness ratio of about 3 to 1 is recommended. Of course other materials may be used. In any event, the objective is to minimize weight while retaining adequate strength for maintaining the shape of the door and keeping the door attached to the trim panel during air bag deployment.

When a metal, such as steel is used for the door retainer 42, the edges may be slotted and rolled as shown in FIG. 6. This provides a round edge for the air bag door 40 that is easier to match with the air bag opening 12. It also provides slots in the inner margin of the retainer 42 that receive portions of the underwrapped margin of the cover 45 for improved bonding of the cover 45 which is made of a relatively soft material which matches the cover 18 of the interior trim panel 10.

Referring now to FIGS. 7 and 8, an automotive trim panel having a discrete air bag door is illustrated in the process of being constructed in accordance with a manufacturing method of the invention. The automotive trim panel 100 comprises a retainer 102 of relatively rigid plastic material such as polycarbonate, polypropylene or any injection moldable plastic and such material may be filled with glass fibers or the like. The substrate may also be a metal casting or stamping that is molded to the final shape needed for functional and pleasing shape of the finished trim panel 100. The substrate can also be made of a porous fiber board like material and other moldable compositions that meet the specifications for a retainer and allow movement or evacuation of air through them.

The trim panel 100 further comprises a cover 104 of relatively soft and flexible decorative material such as expandable foam backed vinyl that is generally die cut from a continuous sheet of the material so that it is larger than a front surface 105 of the retainer that is to be covered. Other examples of a suitable stock for cover 104 include laminations, organic or synthetic cloth or cloth combinations, foam, plastic and other materials generally used in automotive trim panels.

The cover 104 is attached to the retainer 102 by means of a vacuum buck 106 that has a support surface 108 that conforms to the back surface of the retainer 102. The support surface 108 has several surface grooves 110 in a grid pattern that are fluidly connected to an internal plenum that is evacuated by a pump and operates in a well known manner to provide suction in the surface grooves 110.

The trim panel 100 has an opening 112 for deployment of an air bag (not shown) that is closed by a discrete air bag door 114 that may be attached, for example, as illustrated and described in connection with FIGS. 1–6.

The air bag door 114, like the earlier doors examples described above, also comprises a retainer 116 of relatively rigid material and a cover 118 of relatively soft material that matches the cover 104 of the trim panel 100. This door cover 118 is attached to the door retainer 116 at the same time that the trim panel cover 104 is attached to the trim panel retainer 102 in accordance with another aspect of the invention. This is accomplished in a conjoined operation.

In order to effect the simultaneous attachment and ensure excellent surface harmony, the vacuum buck 106 includes second support surface 120 that conforms to the back surface of the retainer 116 for the air bag door 114. This support surface 120 is located at the site of the air bag door 114 in alignment with the air bag door opening in the trim panel retainer 102. The support surface 120, however, is displaced from an annular portion 122 of the support surface 108 that supports the annular margin of the trim panel retainer 102 that surrounds the air bag opening as best shown in FIG. 7. More specifically the support surface 118 is raised above the annular portion 120 of the support surface 108 by a sufficient amount to provide for peripheral margins on the covers 104 and 116 for wrapping around the edges of the air bag opening in the trim panel retainer 102 and the edges of the air bag door retainer 114 respectively. This is approximately 3 inches.

The support surface 120 also has several surface grooves 124 in a grid pattern that are fluidly connected to the internal plenum that is evacuated to provide suction in the surface grooves 110.

The trim panel 100 and discrete air bag door 114 are constructed in the following manner. The trim panel retainer 102 and the air bag door retainer 116 are mounted on respective support surfaces 108 and 120 of the vacuum buck 106. The retainers 102 and 116 have an adhesive applied to their top surfaces either a short time before or after being mounted on the vacuum buck 106. One or two component water or solvent based adhesive is suitable.

An expandable foam backed vinyl sheet of cover stock 126 is then heated and drawn against the top surfaces of the retainers 102 and 116 by vacuum or suction pulling through the surface grooves 110 and 124 of the support surfaces 108 and 120 simultaneously attaching the sheet of cover stock 124 to the retainers 102 and 116 to provide the covers 104 and 118 which are attached to each other by connecting portions of the sheet between the door retainer 116 and the trim panel retainer 102 as shown in FIG. 8. The covers 104 and 118 are then separated along a cut-line that lies between the edge of the air bag opening in the trim panel retainer 102 and the edge of the air bag door retainer 116 such as the cut-line indicated by the dashed line 126 in FIG. 8. The covered retainers 102 and 116 are then removed from the buck 106 and margins of the separated covers 104 and 118 are then wrapped around the edges of the air bag opening in the retainer 102 and the air bag door retainer 116 and bonded to the back sides of the retainers 102 and 116 in a conventional manner.

FIGS. 9 and 10 show an alternate arrangement for simultaneously covering the trim panel retainer 102 the air bag door retainer 116 in a conjoined type operation. In this alternate arrangement, the vacuum buck 206 is modified to include a support surface 218 for the air bag door retainer 116 that is located below the lip 220 of the support surface 222 for a hood portion 103 of the trim panel retainer 102 that outlines a large cut-out 107 for an instrument cluster panel that is considerably larger that the air bag door. Consequently, there is plenty of material in the cover stock for covering the air bag door at this site. Consequently the support surface 218 does not need to be displaced outwardly or raised up to provide sufficient peripheral margins on the covers 104 and 118 after separation for wrapping around the edges of the hood portion 103 of the trim panel retainer 102 and the air bag door retainer 116, respectively. The support surface 218 however, centralized with respect to the cut-out 107 of the hood portion so that the sheet of cover stock 226 drapes smoothly on the upper surface 105 of the air bag door retainer 116 when it is laid on the upper surface 105 of the trim panel retainer 102 and so that the edges of the air bag door retainer 116 are spaced far enough from the edge of the lip 220 to provide the necessary peripheral margins on the covers 104 and 118 for wrapping around the edges of the hood portion 103 of the trim panel retainer 102 and the edges of the air bag door retainer 116 respectively as shown in FIG. 10.

Of course, the support surface 218 also has several surface grooves 224 in a grid pattern that are fluidly connected to an internal plenum that is evacuated to provide suction in the surface grooves 228 of the support surface 230 for the trim panel retainer 104.

The trim panel 100 and the air bag door 114 are constructed in the following manner in conjunction with the modified buck 206. The trim panel retainer 102 and the air bag door retainer 116 are mounted on respective support surfaces 230 and 218 of the modified vacuum buck 206. The retainers 102 and 116 have an adhesive applied to their top surfaces either a short time before or after being mounted on the vacuum buck 206 as before. An expandable foam backed vinyl sheet of cover stock 226 is then heated and drawn against the top surfaces of the retainers 102 and 114 by vacuum or suction pulling through the surface grooves 228 and 222 of the support surfaces 230 and 218 simultaneously attaching the covers 104 and 118. The covers 104 and 118 are then separated along a cut-line that lies between the edge of the hood portion of the trim panel 100 and the edge of the air bag door 114. The covered retainers are then removed from the buck 206 and the margins of the separated covers 104 and 118 are then wrapped around the edges of the hood portion and the air bag door 114 and bonded to the back sides of the retainers 102 and 116 in a conventional manner.

While the above methods of the invention has been described in connection with a vacuum drawing operation, it should be understood that any differential pressure operation such as pneumatic pressure forming can be used.

In other words, the various aspects of the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A method of making a motor vehicle interior trim panel having an opening for deployment of an air bag and a discrete air bag door that is attached to the interior trim panel for closing the opening and for being opened by an air bag when it is deployed, the interior trim panel and the air bag door each having a retainer and a cover comprising:

providing a retainer for the interior trim panel having a front surface to be covered, a back surface and a plurality of holes extending through it from the front surface to the back surface for vacuum drawing a cover against the front surface of the retainer, providing a retainer for the air bag door panel having a front surface to be covered, a back surface and a plurality of holes extending through it from the front surface to the back surface for vacuum drawing a cover against the front surface of the retainer, applying an adhesive to the front surfaces of the retainers, supporting the retainer for the interior trim panel on a first support surface of a vacuum buck, supporting the retainer for the air bag door panel on a second support surface of the vacuum buck that is located below a lip of the first support surface for a hood portion of the retainer for the trim panel outlining an instrument panel cutout so that edges of the retainer for the air bag door are spaced from adjacent edges of the retainer for the trim panel, and forming a cover stock against the front surfaces of the retainers whereby the interior trim panel and the air bag door are covered simultaneously.

2. The method as defined in claim 1 wherein the instrument panel cutout is larger than the retainer for the air bag door.

3. The method as defined in claim 1 comprising the further step of cutting the cover stock between the retainers to separate the cover for the air bag door from the cover for the trim panel.

4. The method as defined in claim 3 wherein the retainers are supported on the vacuum buck so that edges of the retainer for the air bag door are spaced from adjacent edges of the retainer for the trim panel by a sufficient amount to provide peripheral portions on the cover stock for wrapping around the respective edges of the retainers for the air bag door and the trim panel.

5. The method as defined in claim 4 wherein the instrument panel cut out is larger than the retainer for the air bag door.

* * * * *

UNITED STATES PATENT AND TRADEMARK OFFICE
CERTIFICATE OF CORRECTION

PATENT NO. : 5,536,351
DATED : July 16, 1996
INVENTOR(S) : Rheinlander et al

Page 1 of 2

It is certified that error appears in the above-indentified patent and that said Letters Patent is hereby corrected as shown below:

In the Drawings:

Delete figures 4, 5 and 6 and renumber figures 7, 8, 9 and 10 as figures 4,5,6 and 7 respectively as shown in the attached drawing.

In the Abstract:

Line 8 after "deployed." Delete sentence "An alternate door has a bracket attached to the retainer that moves the hinge line rearward."

Column 1, delete lines 66 and 67;

Column 2, delete lines 1 and 2 and insert -- The object of this invention -- ;

Column 2, delete lines 6-16 and insert -- A feature of the invention is that the discrete -- ;

Column 2, delete line 32 and insert therefor -- door; --;

Column 2, delete lines 39-44;

Column 2, line 45 delete "7" and insert therefor -- 4 --;

Column 2, line 47 delete "another embodiment of";

Column 2, line 48 delete "8" and insert therefor -- 5 --;

Column 2, line 49 delete "7" and insert therefor -- 4 --;

UNITED STATES PATENT AND TRADEMARK OFFICE
CERTIFICATE OF CORRECTION

PATENT NO. : 5,536,351
DATED : July 16, 1996
INVENTOR(S) : Rheinlander et al

It is certified that error appears in the above-identified patent and that said Letters Patent is hereby corrected as shown below:

Column 2, line 50 delete "9" and insert therefor -- 6 --;
Column 2, line 52 delete "still";
Column 2, line 53 delete "10" and insert therefor -- 7 -- and delete "9" and insert therefor -- 6 --;
Column 4, delete lines 10-66;
Column 5, delete lines 1-11;
Column 5, line 12 delete "7 and 8" and insert therefor -- 4 and 5 --;
Column 5, line 46 delete "6" and insert therefor -- 3 --;
Column 5, line 65 delete "7" and insert therefor -- 4 --;
Column 6, line 35 delete "9 and 10" and insert therefor -- 6 and 7 --.

Signed and Sealed this

Twenty-ninth Day of October 1996

Attest:

BRUCE LEHMAN

Attesting Officer

Commissioner of Patents and Trademarks